United States Patent
Patterson et al.

(10) Patent No.: US 10,938,784 B2
(45) Date of Patent: Mar. 2, 2021

(54) DEDICATING HARDWARE DEVICES TO VIRTUAL MACHINES IN A COMPUTER SYSTEM

(71) Applicant: Assured Information Security, Inc., Rome, NY (US)

(72) Inventors: Christopher James Patterson, Rome, NY (US); Rian Quinn, Highlands Ranch, CO (US); Katherine Julia Temkin, Denver, CO (US); Harlan Philip White, Clinton, NY (US)

(73) Assignee: ASSURED INFORMATION SECURITY, INC., Rome, NY (US)

( * ) Notice: Subject to any disclaimer, the term of this patent is extended or adjusted under 35 U.S.C. 154(b) by 417 days.

(21) Appl. No.: 15/831,610

(22) Filed: Dec. 5, 2017

(65) Prior Publication Data
US 2019/0173846 A1    Jun. 6, 2019

(51) Int. Cl.
*G06F 21/00* (2013.01)
*H04L 29/06* (2006.01)
*G06F 9/455* (2018.01)
*H04L 29/08* (2006.01)

(52) U.S. Cl.
CPC ...... *H04L 63/0272* (2013.01); *G06F 9/45545* (2013.01); *G06F 9/45558* (2013.01); *H04L 63/1425* (2013.01); *H04L 67/38* (2013.01); *G06F 2009/45579* (2013.01); *G06F 2009/45587* (2013.01); *G06F 2009/45595* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,353,722 B2 * | 7/2019 | Karino | G06F 9/5044 |
| 10,423,774 B1 * | 9/2019 | Zelenov | G06F 21/445 |
| 2005/0198412 A1 * | 9/2005 | Pedersen | H04L 63/0428 710/30 |

(Continued)

OTHER PUBLICATIONS

Jin, Xin & Keller, Eric & Rexford, Jennifer. (2012). Virtual switching without a hypervisor for a more secure cloud. 9-9. (Year: 2012).*

(Continued)

*Primary Examiner* — Jeffery L Williams
(74) *Attorney, Agent, or Firm* — Matthew M. Hulihan; Heslin Rothenberg Farley & Mesiti PC

(57) ABSTRACT

Dedicating hardware devices to virtual machines includes dedicating, by a hypervisor executing on a computer system, a set of hardware devices of the computer system to a first virtual machine of the hypervisor, the first virtual machine executing a guest operating system, and the set of hardware devices for use by the guest operating system in execution of the guest operating system, and dedicating network device hardware of the computer system to a second virtual machine of the hypervisor, the second virtual machine being a different virtual machine than the first virtual machine, wherein network communication between the guest operating system and a network to which the computer system is connected via the network device hardware occurs via the second virtual machine.

20 Claims, 4 Drawing Sheets

(56) References Cited

U.S. PATENT DOCUMENTS

| | | | | |
|---|---|---|---|---|
| 2009/0328170 | A1* | 12/2009 | Williams | G06F 21/41 726/7 |
| 2013/0276133 | A1* | 10/2013 | Hodges | G06F 21/60 726/27 |
| 2014/0282050 | A1* | 9/2014 | Quinn | G06F 3/0481 715/744 |
| 2017/0177396 | A1* | 6/2017 | Palermo | H04L 49/70 |
| 2017/0264622 | A1* | 9/2017 | Cooper | G06F 21/606 |
| 2018/0210751 | A1* | 7/2018 | Pepus | G06F 9/45558 |
| 2019/0173846 | A1* | 6/2019 | Patterson | G06F 9/45545 |
| 2019/0250938 | A1* | 8/2019 | Claes | G06F 9/45533 |

OTHER PUBLICATIONS

Patrick Colp, et al,. Breaking up is hard to do: security and functionality in a commodity hypervisor. In Proceedings of the Twenty-Third ACM Symposium on Operating Systems Principles (SOSP '11). Association for Computing Machinery, New York, NY, USA, 189-202. (Year: 2011).*

Fraser, Keir et al. "Safe Hardware Access with the Xen Virtual Machine Monitor." (2007). (Year: 2007).*

De Zylva, A., "Windows 10 Device Guard and Credential Guard Demystified", [retrieved on Dec. 4, 2017]. Retrieved from the Internet URL: < https://blogs.technet.microsoft.com/ash/2016/03/02/windows-10-device-guard-and-credential-guard-demystified/ >, Mar. 2, 2016, 11 pgs.

"Bareflank Hypervisor TM", [retrieved on Dec. 4, 2017]. Retrieved from the Internet URL: < http://bareflank.github.io/hypervisor/ >, 2 pgs.

"Bareflank/hypervisor", [retrieved on Dec. 4, 2017]. Retrieved from the Internet URL: < https://github.com/Bareflank/hypervisor >, 2017 GitHub, Inc., 5 pgs.

"Simplevisor", [retrieved on Dec. 4, 2017]. Retrieved from the Internet URL: < https://ionescu007.github.io/SimpleVisor/>, 4 pgs.

"Ionescu007/SimpleVisor", [retrieved on Dec. 4, 2017]. Retrieved from the Internet URL: < https://github.com/ionescu007/SimpleVisor >, 5 pgs.

"McAfee Reshapes Industry with Breakthrough Security Technology", [retrieved on Dec. 4, 2017]. Retrieved from the Internet URL: < https://www.mcafee.com/us/about/news/2011/q3/20110913-01.aspx >, Intel Developer Forum, San Francisco, Sep. 13, 2011, 3 pgs.

Brewster, T., "McAfee releases first DeepSAFE product", [retrieved on Dec. 4, 2017]. Retrieved from the Internet URL: http://www.itpro.co.uk/636817/mcafee-releases-first-deepsafe-product >, Oct. 19, 2011, 6 pgs.

* cited by examiner

DEDICATING HARDWARE DEVICES TO VIRTUAL MACHINES IN A COMPUTER SYSTEM

BACKGROUND

It is desirable at times for a computer system to access and work with sensitive information, such as government classified information. Challenges arise when the computer system incorporates or accesses other, non-classified entities that lack the same levels of security sufficient for protecting sensitive information. In some cases, a separate network line/connection is made for connection to a classified network. The physical security measures taken to support such a separate connection can be cumbersome.

In one approach, connection to a classified network is tunneled over an unclassified network connection using multiple layers of virtual private network (VPN) connectivity, in which classified data is encrypted over one VPN and encrypted again over another VPN. That approach can also be cumbersome, particularly when a hypervisor is involved and multiplexes access to hardware. In a typical computer system, the hardware is dedicated to the operating system (OS) and the OS 'owns' that hardware. Advantages may be gained by providing a hypervisor-based Multiple Independent Levels of Security/Safety (MILS) system designed to provide cross-domain access. Such a system may be capable of providing both single domain and multi-domain access to user-facing guest virtual machines. They can leverage existing hypervisors and reduce overall cost while providing Commercial Solutions for Classified (CSfC) networking. On a hypervisor-based Multiple Independent Levels of Security/Safety (MILS) system, the hypervisor, which may as one example be the Xen® hypervisor offered by the Xen Project, owns the hardware and provides emulated hardware to each virtual machine. However, even in this approach installation can be difficult, performance can be lacking, and users will typically notice the presence of the hypervisor.

SUMMARY

Shortcomings of the prior art are overcome and additional advantages are provided through the provision of a computer-implemented method. The method includes dedicating, by a hypervisor executing on a computer system, a set of hardware devices of the computer system to a first virtual machine of the hypervisor, the first virtual machine executing a guest operating system, and the set of hardware devices for use by the guest operating system in execution of the guest operating system. The method further includes dedicating network device hardware of the computer system to a second virtual machine of the hypervisor, the second virtual machine being a different virtual machine than the first virtual machine, wherein network communication between the guest operating system and a network to which the computer system is connected via the network device hardware occurs via the second virtual machine.

Further, a computer program product is provided that includes a computer readable storage medium storing instructions for execution to perform a method. The method includes dedicating, by a hypervisor executing on a computer system, a set of hardware devices of the computer system to a first virtual machine of the hypervisor, the first virtual machine executing a guest operating system, and the set of hardware devices for use by the guest operating system in execution of the guest operating system. The method further includes dedicating network device hardware of the computer system to a second virtual machine of the hypervisor, the second virtual machine being a different virtual machine than the first virtual machine, wherein network communication between the guest operating system and a network to which the computer system is connected via the network device hardware occurs via the second virtual machine.

Yet further, a computer system is provided that is configured to perform a method. The method includes dedicating, by a hypervisor executing on a computer system, a set of hardware devices of the computer system to a first virtual machine of the hypervisor, the first virtual machine executing a guest operating system, and the set of hardware devices for use by the guest operating system in execution of the guest operating system. The method further includes dedicating network device hardware of the computer system to a second virtual machine of the hypervisor, the second virtual machine being a different virtual machine than the first virtual machine, wherein network communication between the guest operating system and a network to which the computer system is connected via the network device hardware occurs via the second virtual machine.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for a hypervisor-based approach to networking, particularly through hypervisor-assisted partitioning of the hardware of a computer system. A computer system can leverage a hypervisor to accomplish aspects discussed herein, for instance to accomplish Commercial Solutions for Classified (CSfC) networking.

Figure 1:
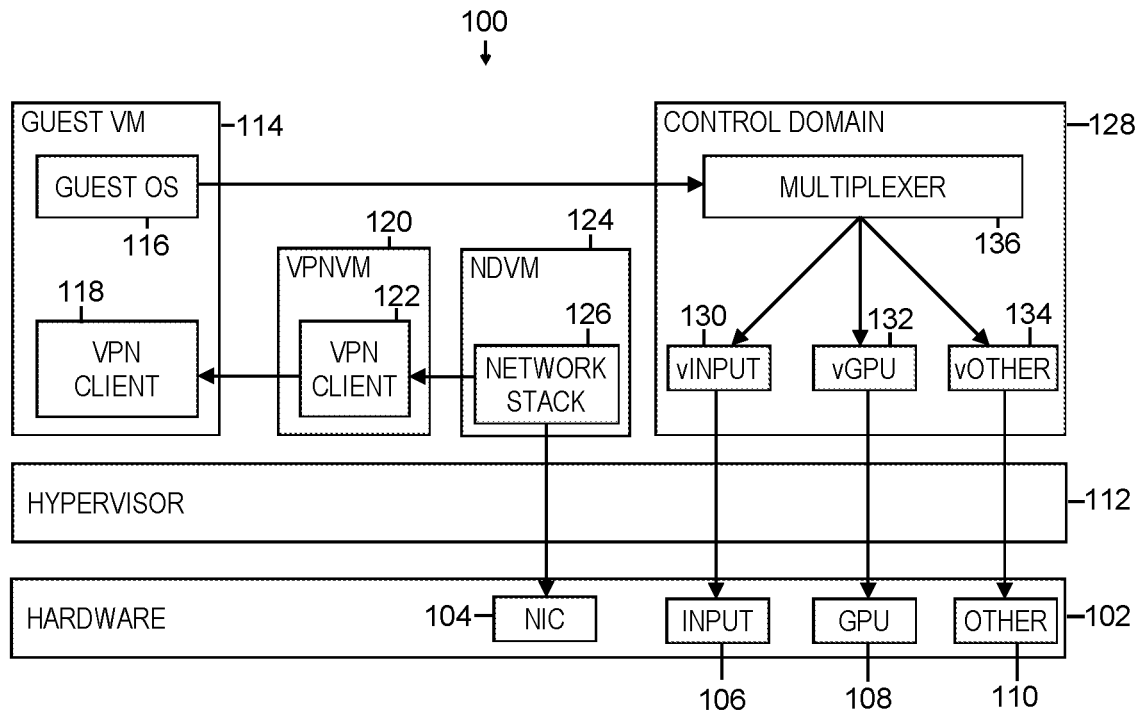
FIG. 1 depicts an example computer system implementing a hypervisor-based Multiple Independent Levels of Security/Safety approach.

FIG. 1 depicts an example computer system 100 implementing a hypervisor-based Multiple Independent Levels of Security/Safety (MILS) approach. Computer system 100 has hardware 102 constituting the hardware resources of the system, such as processor(s), main memory, I/O devices, network hardware, graphics hardware, etc. Depicted in FIG. 1 are physical network interface card (NIC) 104, input devices 106, graphics processing unit (GPU) 108, and other devices collectively termed Other 110.

A hypervisor 112 sits (conceptually) above hardware 102 and provides virtual machine environment(s) that may execute, e.g., one or more operating systems and other computer programs. There are four virtual machines above hypervisor 112 in FIG. 1: a guest virtual machine 114 running a guest operating system 116 and virtual private network (VPN) client 118, a VPN virtual machine (VPNVM) 120 running VPN client 122, a network domain virtual machine (NDVM) 124, and a control domain 128.

To enable potentially multiple virtual machines to use the underlying hardware, the control domain 128 is responsible for multiplexing communication between the individual hardware components 102 and the virtual machine(s) that use these hardware components. The control domain 128 establishes an emulated device for the corresponding physical hardware component to which access is multiplexed. In this example, the control domain 128 establishes emulated devices vInput 130, vGPU 132, and vOther 134 to emulate the Input 106, GPU 108, and Other 110 hardware device(s), respectively. Multiplexer 136 multiplexes communications flowing between the guest virtual machine(s) that need access to the hardware and the physical devices of the hardware 102 through these emulated devices.

The NDVM 124 provides a virtual machine to handle guest VM 114's network access to the underlying network interface card (NIC) hardware 104. This places the network stack 126 into the NDVM. Network traffic between guest VM 114 and NIC 104 flows between NIC 104, network stack 126 of NDVM 124, VPN client 122 of VPNVM 120, and VPN client 118 of guest VM 114. Providing VM(s) to run the VPN(s) allows deployment of CSfC to existing endpoints. However, as noted above, installation can be difficult, performance can be lacking, and users will typically notice the presence of the hypervisor 112.

Aspects described herein overcome disadvantages of multiplexing hardware access and enable a single domain that does not rely on multiplexing. Different hardware is dedicated to different VMs and VPN(s) are run alongside a guest operating system in a way that separates the OS from the network stack and vice versa. An attacker is unable to obtain access through the VPN(s) without separately compromising them. One advantage is that the involved VPN(s) can securely provide sensitive, e.g. classified, data tunneled over an unclassified network line connected to the NIC.

As described further herein, an operating system runs in a virtual machine and is dedicated particular hardware. Network device hardware, for instance a NIC, is dedicated to a separate virtual machine that does not need device emulation or multiplexing. In some examples, this separate virtual machine runs as a service in the background, lacks graphics, device input, and other capabilities traditionally afforded a virtual machine, but has dedicated to it (as opposed to having multiplexed access to) the physical network device hardware. This network device virtual machine bridges the gap between the physical hardware device (NIC) and the operating system running in the guest VM, via a defined interface (driver). This is in contrast to other approaches that use a hypervisor to run multiple guests with multiple operating systems that have multiplexed access to all hardware that a real machine might have.

In some embodiments, aspects described herein may be installed on an existing computer system (one with an operating system and no hypervisor already installed), with no system reloading required. This may be facilitated using a 'late-launch' hypervisor that can be loaded as a driver from within the operating system, as one example.

Figure 2:
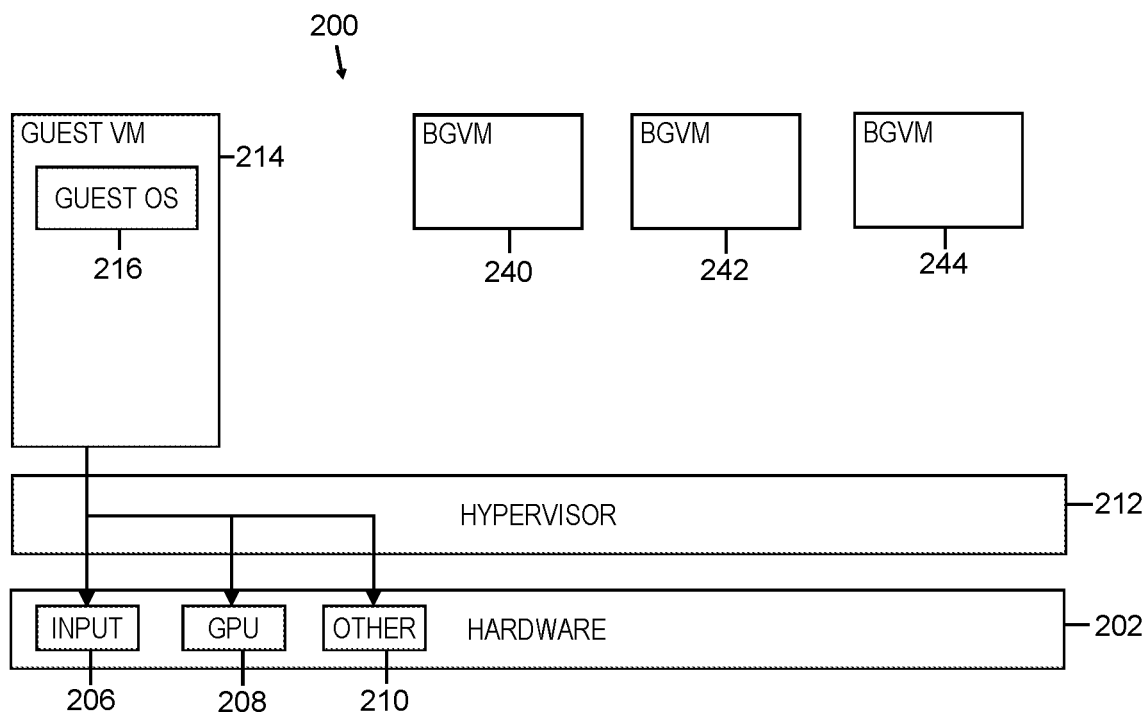
FIG. 2 depicts an example computer system with multiple guest virtual machines.

FIG. 2 depicts an example computer system 200 with multiple guest virtual machines. FIG. 2, similar to FIG. 1, has multiple guest virtual machines but in this scenario the hypervisor partitions system resources for VM use, rather than relying on multiplexed access to emulated versions of the physical devices. Hardware 202 includes Input 206, GPU 208, and Other 210 hardware devices that are partitioned (dedicated) by hypervisor 212 to guest VM 214 running guest OS 216. An example hypervisor that is capable of such partitioning is the Bareflank® Hypervisor, available at GitHub, which can be used to partition-off portions of the system hardware between various different virtual machines (BAREFLANK is a trademark of Assured Information Security, Inc., Rome, N.Y., U.S.A.). This avoids multiplexing the accesses to hardware via emulated hardware. In addition, this can be done as a type-1 or type-2 hypervisor environment.

Meanwhile, three (in this example) background VMs 240, 242, 244 execute in the background of the computer system. Guest VM 214 retains focus insofar as user interaction is concerned, but one or more services, for instance that do not require access to physical hardware, may be placed into dedicated background VM(s).

It is noteworthy that even through a hypervisor is running in the scenario of FIG. 2, the guest OS 216, such as a Windows® operating system offered by Microsoft Corporation, Redmond, Wash., USA, 'owns' the hardware the same way that the operating system would natively own the hardware if no hypervisor is installed. Thus, while some hypervisors multiplex physical device access, the hypervisor of FIG. 2 is dedicating the hardware to guest VM 214.

Such a hypervisor can also partition the hardware and dedicate different sets to different VMs. In accordance with aspects described herein, network device hardware, for example NIC hardware, is dedicated to another VM, for instance a relatively lightweight VM dedicated to servicing the network device hardware, rather than being owned by or dedicated to the guest OS running in the guest VM. This can provide CSfC compliance and expand guard technologies for domain (zone) isolation as explained in further detail herein.

Figure 3:
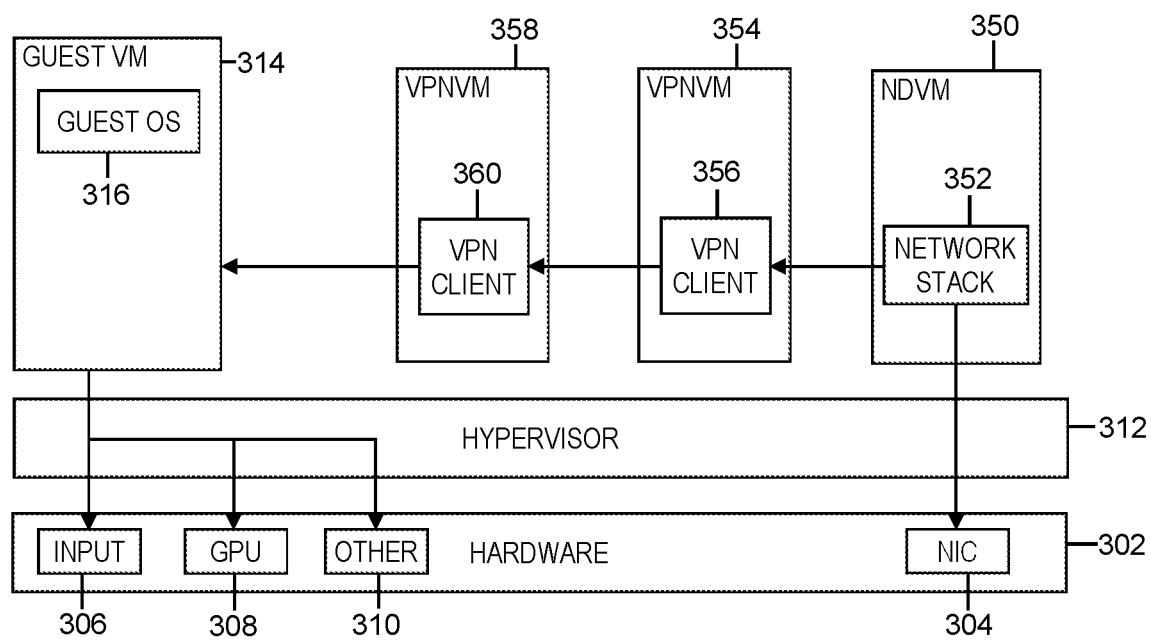
FIG. 3 depicts an example computer system that isolates network hardware and virtual private networks from a guest operating system, in accordance with aspects described herein.

A particular example leverages the Bareflank® hypervisor to isolate the network stack and VPNs from the guest OS. FIG. 3 depicts one example computer system that isolates network hardware and virtual private networks from a guest operating system, in accordance with aspects described herein.

Generally, the hypervisor can dedicate to the guest VM (and therefore guest OS) a set of hardware devices, giving the guest OS non-multiplexed access to the hardware that is necessary or desired for use in execution of the guest OS. The guest OS has access to the hardware absent/without multiplexing that access by way of, e.g., a control domain VM, or by the hypervisor itself. Meanwhile, the hypervisor dedicates network device hardware, by way of removing the network stack for instance, to a separate VM, the NDVM. This is depicted in FIG. 3, where hypervisor 312 partitions the hardware 302 to two VMs, dedicating a set of hardware devices—Input 306, GPU 308 and Other 310—to the guest VM 314 that executes the guest OS 316, and dedicating NIC 304 to NDVM 350 with network stack 352. Network communication between the guest OS 316 and the network (not depicted) to which the computer system is connected occurs through the NDVM 350 and in this case two VPN VMs 354, 358 each running a VPN client (356 and 360, respectively). In some examples, guest OS 316 is a Windows® OS, and VMs 350, 354, 358 each run a Linux®-based OS.

Guest VM 314 in this example does not have or need a hardware NIC. The NDVM 350, to which the NIC is dedicated, has the proper driver specific to NIC 304. The Guest VM 314 and the VPN VMs 354, 358 have virtual network interfaces (VNICs) to enable logical data flows between the Guest VM and the hardware NIC 304.

The VPNVM (or each VPNVM if there are multiple, as in the example of FIG. 3) acts as an inline encryption device in these examples. The VPNVM includes a VPN client and software routing components to manage data flows. Data flows from the trusted side (such as the guest VM) are received via a virtual network interface, encrypted by its VPN client, and subsequently routed on to an untrusted side (such as NDVM). The NDVM will then transparently route encrypted data flow from its virtual network device to the hardware network device (physical NIC).

Data flows are supported in the reverse direction for the VPNVM. Incoming data from an untrusted side (such as an NDVM), is decrypted by its VPN client. This decrypted data flow is then routed towards its trusted side (such as Guest VM).

Partitioning the hardware to dedicate it to different VM(s) in this manner is accomplished in some examples by booting an existing non-virtualized system with an existing OS installed thereon, installing a late-launch hypervisor configured to partition the hardware and establish VPN pass-throughs as described herein, and rebooting into a CSfC environment. The hypervisor is installed underneath the existing OS as a type-1 late-launch hypervisor that that takes control over the dedication of hardware to the OS and forces the desired hardware isolation.

This architecture can be more secure than running the OS by itself on the bare metal of the computer system. Many OSs generally use a relatively small portion (in some cases as little as 5-10%) of the hardware presented by the computer system during normal OS operation. It is common for security attacks to leverage vulnerabilities of these extraneous hardware components that the OS does not use. Aspects described herein can expose to the OS only the hardware needed for the OS to run as desired, isolating the rest of the hardware, which may include network device hardware as an example, to other VM(s). The hypervisor can effectively whitelist for the guest VM the hardware that the guest OS needs to operate and block guest OS ownership of the other hardware, thus drastically reducing the attack surface. Isolating some hardware (e.g. the NIC) to another VM (e.g. NDVM) means the guest OS no longer has unfettered access to that hardware (and vice-versa). The guest OS and hardware communicate with each other through the interposed VPN VMs, which provide a security barrier to isolate them from each other. Dedicating the network resources (e.g. the TCP/IP stack that attackers frequently target) to another VM means that an attacker who maliciously obtains access to the TCP/IP stack is stuck in the NDVM without access to the guest OS, absent being able to compromise each of the VPN VMs/clients or the hypervisor itself to overcome the isolation of the NDVM and obtain access to the guest OS. Meanwhile, other hardware not dedicated to either guest VM or the NDVM may be dedicated to yet another VM to serve any desired purpose or no purpose.

Thus, as illustrated in FIG. 3, the NIC hardware is dedicated to the NDVM and the guest OS has networking connectivity through that NDVM. This example includes interposed VPNs to provide two layers of encryption that the guest OS never sees and that enables heightened security, e.g. CSfC. The guest OS is unaware that the network traffic is proceeding through two (in this example) levels of VPN.

From the perspective of the NIC hardware on the remote side, only the NDVM with the network appropriate resources, e.g. TCP/IP stack, is observable. Even if access were gained through the NIC hardware to the NDVM, the attacker would see encrypted data. Separating the network stack 352 from the guest VM to provide isolation enhances security because even a successful network attack against the NDVM would render viewable only the encrypted data flowing through the NDVM, as it is the encrypted VPN data flowing between the VPN client(s) (e.g. clients 356, 360 in FIG. 3) and the network.

The VPN clients are shown placed in dedicated VMs in this example to leverage hypervisor-provided isolation of virtual machines, but in an alternative approach, one or more VPN clients are instead installed on the guest VM itself.

In yet another example, VPN functionality is not necessary or desired, no VM VMs are interposed between the guest VM and NDVM, and a desired level of security is provided merely by virtue of the hypervisor's isolation of hosted VMs. This may be desired when VM-based isolation of the guest OS from certain hardware resources is satisfactory.

Advantageously, a high level of security can be delivered even when installing on existing system, using familiar tools (i.e. the OS's native installer, such as the Windows® installer), absent a need to wipe the system. No emulation or legacy support is needed to provide direct access to hardware, reducing complexity and increasing performance. Additionally, a modular design makes the approach capable of supporting multiple form factors on multiple architectures. The hypervisor itself may be written in a way that system-specific modules may be swapped-out to accommodate given system characteristics, such as the particular guest OS and/or computer system architecture, such as the Linux®, ARM (of ARM Holdings plc, Cambridge, England, United Kingdom), or Intel (of Intel Corporation, Santa Clara, Calif., U.S.A.) architectures, as examples.

Moreover, approaches described herein may be more secure than running the guest OS on native hardware, as the network stack is isolated from the guest OS and the hypervisor can leverage hardware extensions, such as Intel®'s VT-x and VT-d virtualization extensions, to block hardware-based attacks.

Figure 4:
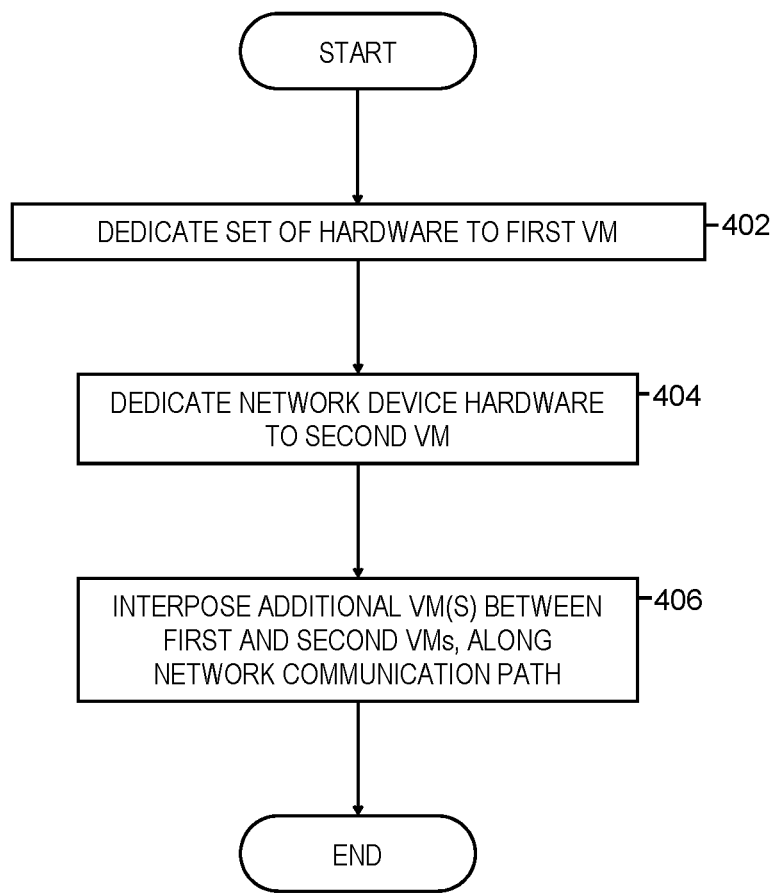
FIG. 4 depicts an example process for partitioning hardware of a computer system, in accordance with aspects described herein.

FIG. 4 depicts an example process for partitioning hardware of a computer system, in accordance with aspects described herein. In some examples, the process is performed by one or more computer systems, such as those described herein, and more particularly by a software component thereof, for example a hypervisor executing on the computer system.

The process includes dedicating a set of hardware device(s) of the computer system to a first virtual machine of the hypervisor (402). Dedicating gives 'ownership' of the hardware to the first virtual machine. The first virtual machine executes a guest operating system, and the set of hardware devices dedicated to the first VM is for use by the guest operating system in execution of the guest operating system. The set of hardware devices may be any desired hardware of the computer system.

The process continues by dedicating network device hardware of the computer system to a second virtual machine of the hypervisor (404). The second virtual machine is a different virtual machine than the first virtual machine. Network communication between the guest operating system and a network to which the computer system is connected via the network device hardware occurs via the second virtual machine. It is noted that the network communication may or may not encompass all of the network communication between the guest OS and the network.

In some examples, the network device hardware includes a network interface card (NIC). Dedicating the network device hardware to the second virtual machine can include placing into the second virtual machine a network stack facilitating the network communication between the guest operating system and the network to which the computer system is connected.

Dedicating the network device hardware to the second virtual machine can dedicate, as one example, network interface interrupts, generated by the network device hardware, to the second virtual machine for handling.

The set of hardware devices (dedicated to the first VM) and the network device hardware (dedicated to the second VM) are part of hardware of the computer system. Dedicating the set of hardware devices and dedicating the network device hardware can partitions the hardware of the computer system, and do so absent/without multiplexing usage of the hardware by virtual machines of the hypervisor. That is, in operation, it may be the case that no multiplexing of access/usage of the hardware occurs.

Continuing with FIG. 4, the process also interposes one or more additional virtual machines between the first virtual machine and the second virtual machine along a network communication path (406) across which the network communication is passed. Each virtual machine of the one or more additional virtual machines can separately perform encryption/decryption on communications between the first virtual machine and the second virtual machine. In some examples, the one or more additional VM are in serial communication along the communication path and iteratively, at each such VM as the traffic is passed along the path, encrypts/decrypts the traffic.

Interposing additional VM(s) can also be used to control information exchange between the two entities. In some examples, the one or more additional virtual machines implement at least one guard configured for constraining communications between the first virtual machine and the second virtual machine.

In some embodiments, the hypervisor is loaded and the hardware dedication occurs on a system already in use. An operating system may be installed on the computer system prior to installation of the hypervisor, and the hypervisor may be installed on the computer system at a higher privilege level than the installed operating system and force isolation of the installed operating system into the first virtual machine as the guest operating system thereof.

The hypervisor can include configuration information indicating enabling hardware, of the computer system, that enables operation of the guest operating system (for instance what the guest needs to run properly), and the hypervisor dedicates, on the basis of the configuration information, the allowed hardware, as the set of hardware devices, to the guest operating system and blocks direct access by the guest operating system to a remainder of the hardware, of the computer system, not indicated as enabling hardware. In this manner, the hypervisor can whitelist and blacklist hardware usage for different VMs.

Although various examples are provided, variations are possible without departing from a spirit of the claimed aspects.

Figure 5:
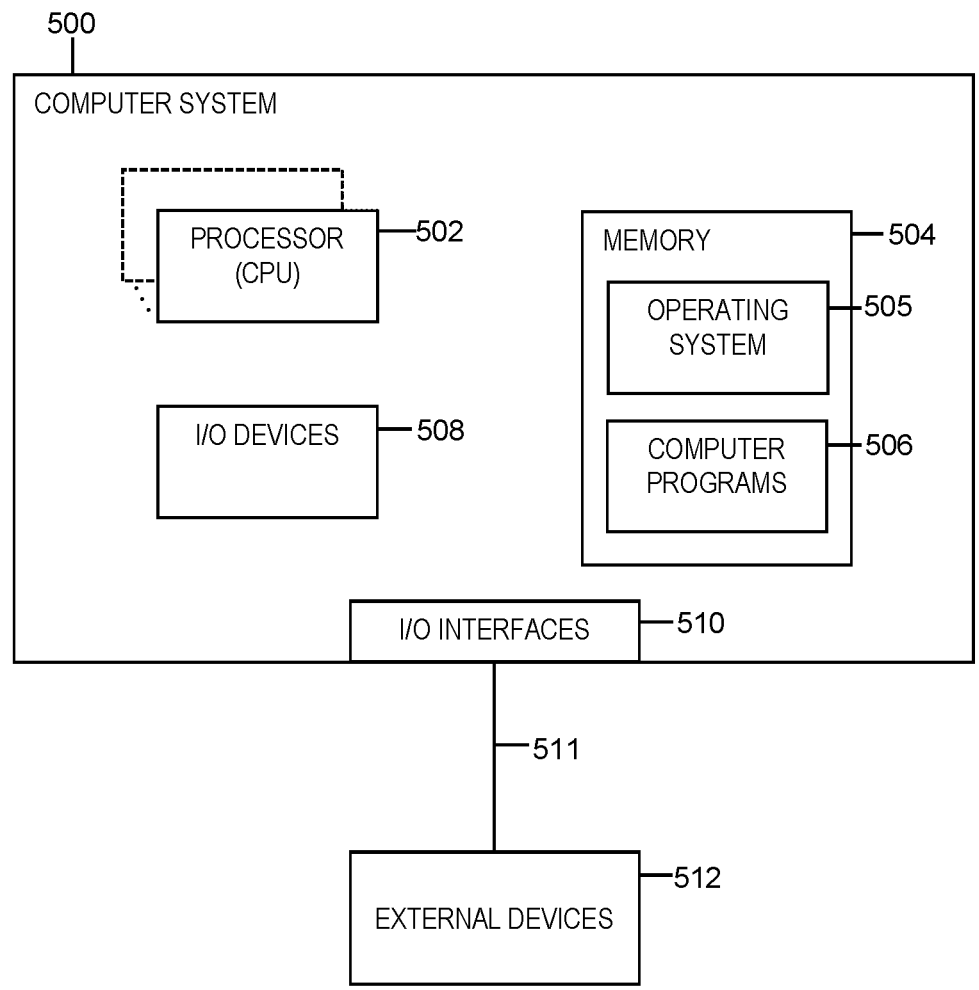
FIG. 5 depicts one example of a computer system and associated devices to incorporate and/or use aspects described herein.

Processes described herein may be performed singly or collectively by one or more computer systems. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, Calif., USA), as an example.

FIG. 5 shows a computer system 500 in communication with external device(s) 612. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

The present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
dedicating, by a hypervisor executing on a computer system, a set of hardware devices of the computer system to a first virtual machine hosted by the hypervisor, the first virtual machine executing a guest operating system, and the dedicating the set of hardware devices providing the set of hardware devices for use by the guest operating system in execution of the guest operating system absent emulated access by the first virtual machine to the set of hardware devices and absent multiplexing use of the set of hardware devices; and
dedicating network device hardware of the computer system to a second virtual machine hosted by the hypervisor, the second virtual machine being a different virtual machine than the first virtual machine, wherein the dedicating the network device hardware to the second virtual machine provides the network device hardware for use by the second virtual machine absent emulated access by the second virtual machine to the network device hardware and absent multiplexing use of the network device hardware for passing network traffic therethrough, and wherein network communication between the guest operating system and a network to which the computer system is connected via the network device hardware occurs via the second virtual machine.

2. The method of claim 1, wherein the set of hardware devices and the network device hardware are part of hardware of the computer system and wherein the dedicating the set of hardware devices and the dedicating the network device hardware partitions the hardware of the computer system absent multiplexing usage of the hardware by virtual machines of the hypervisor.

3. The method of claim 1, wherein the network device hardware comprises a network interface card.

4. The method of claim 3, wherein the dedicating the network device hardware to the second s virtual machine comprises placing into the second virtual machine a network stack facilitating the network communication between the guest operating system and the network to which the computer system is connected.

5. The method of claim 4, wherein the dedicating the network device hardware to the second virtual machine dedicates network interface interrupts, generated by the network device hardware, to the second virtual machine for handling.

6. The method of claim 1, further comprising interposing one or more additional virtual machines between the first virtual machine and the second virtual machine along a network communication path across which the network communication is passed.

7. The method of claim 6, wherein the one or more additional virtual machines implement at least one guard configured for constraining communications between the first virtual machine and the second virtual machine.

8. The method of claim 6, wherein each virtual machine of the one or more additional virtual machines performs encryption on communications between the first virtual machine and the second virtual machine.

9. The method of claim 1, wherein an operating system is installed on the computer system prior to installation of the hypervisor, and wherein the hypervisor is installed on the computer system at a higher privilege level than the installed operating system and forces isolation of the installed operating system into the first virtual machine as the guest operating system thereof.

10. The method of claim 1, wherein the hypervisor comprises configuration information indicating enabling hardware, of the computer system, that enables operation of the guest operating system, and wherein the hypervisor dedicates, on the basis of the configuration information, the allowed hardware, as the set of hardware devices, to the guest operating system and blocks direct access by the guest operating system to a remainder of the hardware, of the computer system, not indicated as enabling hardware.

11. A computer program product comprising:
a non-transitory computer readable storage medium storing instructions for execution to perform a method comprising:
dedicating, by a hypervisor executing on a computer system, a set of hardware devices of the computer system to a first virtual machine hosted by the hypervisor, the first virtual machine executing a guest operating system, and the dedicating the set of hardware devices providing the set of hardware devices for use by the guest operating system in execution of the guest operating system absent emulated access by the first virtual machine to the set of hardware devices and absent multiplexing use of the set of hardware devices; and
dedicating network device hardware of the computer system to a second virtual machine hosted by the hypervisor, the second virtual machine being a different virtual machine than the first virtual machine, wherein the dedicating the network device hardware to the second virtual machine provides the network device hardware for use by the second virtual machine absent emulated access by the second virtual machine to the network device hardware and absent multiplexing use of the network device hardware for passing the network traffic therethrough, and wherein network communication between the guest operating system and a network to which the computer system is connected via the network device hardware occurs via the second virtual machine.

12. The computer program product of claim 11, wherein the set of hardware devices and the network device hardware are part of hardware of the computer system and wherein the dedicating the set of hardware devices and the dedicating the network device hardware partitions the hardware of the computer system absent multiplexing usage of the hardware by virtual machines of the hypervisor.

13. The computer program product of claim 11, wherein the method further comprises interposing one or more additional virtual machines between the first virtual machine and the second virtual machine along a network communication path across which the network communication is passed.

14. The computer program product of claim 13, wherein the one or more additional virtual machines implement at least one guard configured for constraining communications between the first machine and the second virtual machine.

15. The computer program product of claim 11, wherein the hypervisor comprises configuration information indicating enabling hardware, of the computer system, that enables operation of the guest operating system, and wherein the hypervisor dedicates, on the basis of the configuration information, the allowed hardware, as the set of hardware devices, to the guest operating system and blocks direct access by the guest operating system to a remainder of the hardware, of the computer system, not indicated as enabling hardware.

16. A computer system comprising:
a memory; and
a processor in communication with the memory, wherein the computer system is configured to perform a method, the method comprising:
dedicating, by a hypervisor executing on a computer system, a set of hardware devices of the computer system to a first virtual machine hosted by the hypervisor, the first virtual machine executing a guest operating system, and the dedicating the set of hardware devices providing the set of hardware devices for use by the guest operating system in execution of the guest operating system absent emulated access by the first virtual machine to the set of hardware devices and absent multiplexing use of the set of hardware devices; and
dedicating network device hardware of the computer system to a second virtual machine hosted by the hypervisor, the second virtual machine being a different virtual machine than the first virtual machine, wherein the dedicating the network device hardware to the second virtual machine provides the network device hardware for use by the second virtual machine absent emulated access by the second virtual machine to the network device hardware and absent multiplexing use of the network device hardware for passing network traffic therethrough, and wherein network communication between the guest operating system and a network to which the computer system is connected via the network device hardware occurs via the second virtual machine.

17. The computer system of claim 16, wherein the method further comprises interposing one or more additional virtual machines between the first virtual machine and the second virtual machine along a network communication path across which the network communication is passed.

18. The computer system of claim 17, wherein the one or more additional virtual machines implement at least one guard configured for constraining communications between the first virtual machine and the second virtual machine.

19. The computer system of claim 16, wherein the hypervisor comprises configuration information indicating enabling hardware, of the computer system, that enables operation of the guest operating system, and wherein the hypervisor dedicates, on the basis of the configuration information, the allowed hardware, as the set of hardware devices, to the guest operating system and blocks direct access by the guest operating system to a remainder of the hardware, of the computer system, not indicated as enabling hardware.

20. The method of claim 2, wherein the dedicating the network device hardware to the second virtual machine comprises providing use of the network device hardware to the second virtual machine absent multiplexing usage of the network device hardware by any virtual machine hosted by the hypervisor.

* * * * *